May 22, 1928.
F. D. PEARNE ET AL
1,670,421
TYPEWRITER TELEGRAPH
Filed July 16, 1926
14 Sheets-Sheet 1
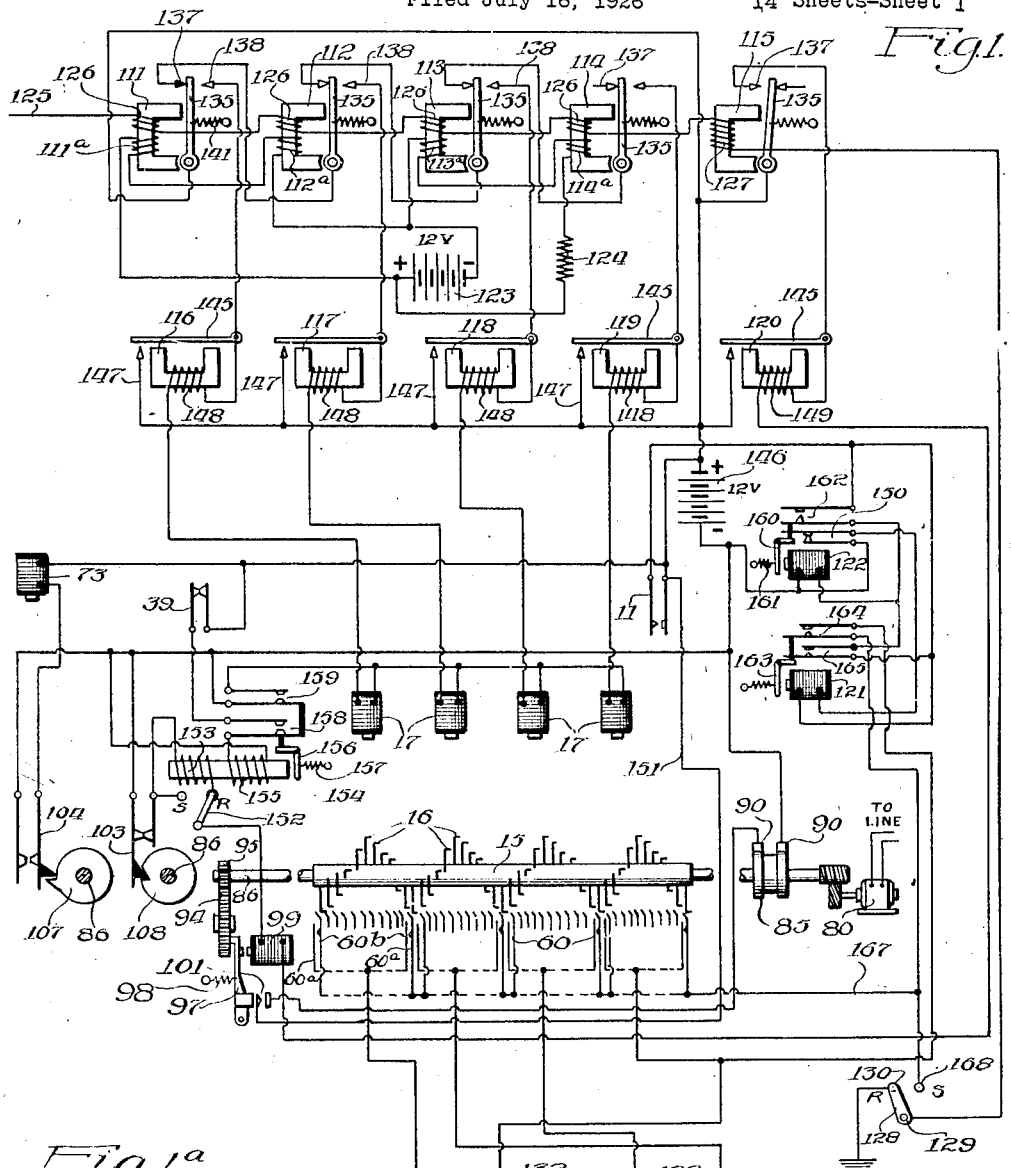

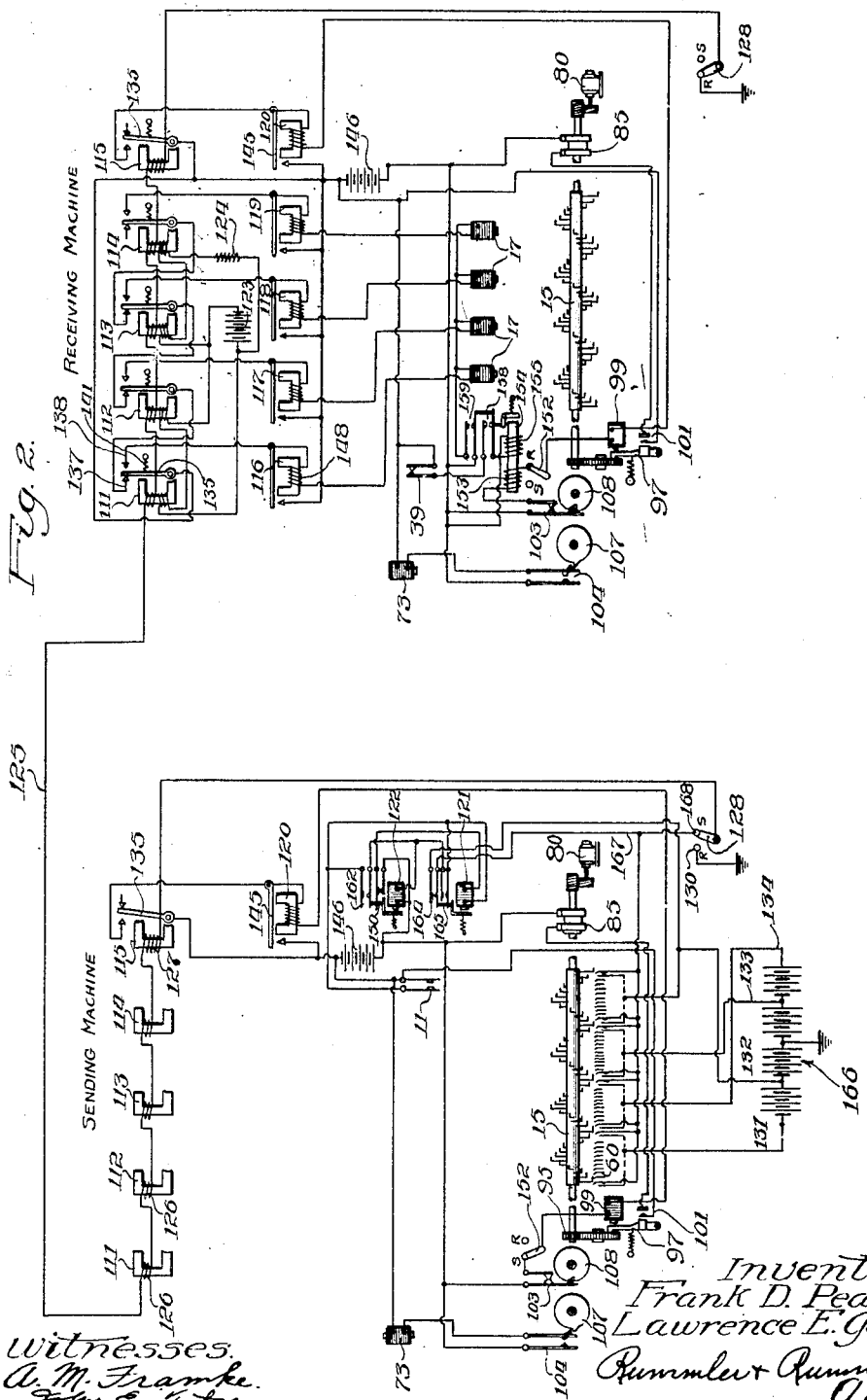

May 22, 1928.  1,670,421
F. D. PEARNE ET AL
TYPEWRITER TELEGRAPH
Filed July 16, 1926     14 Sheets-Sheet 3
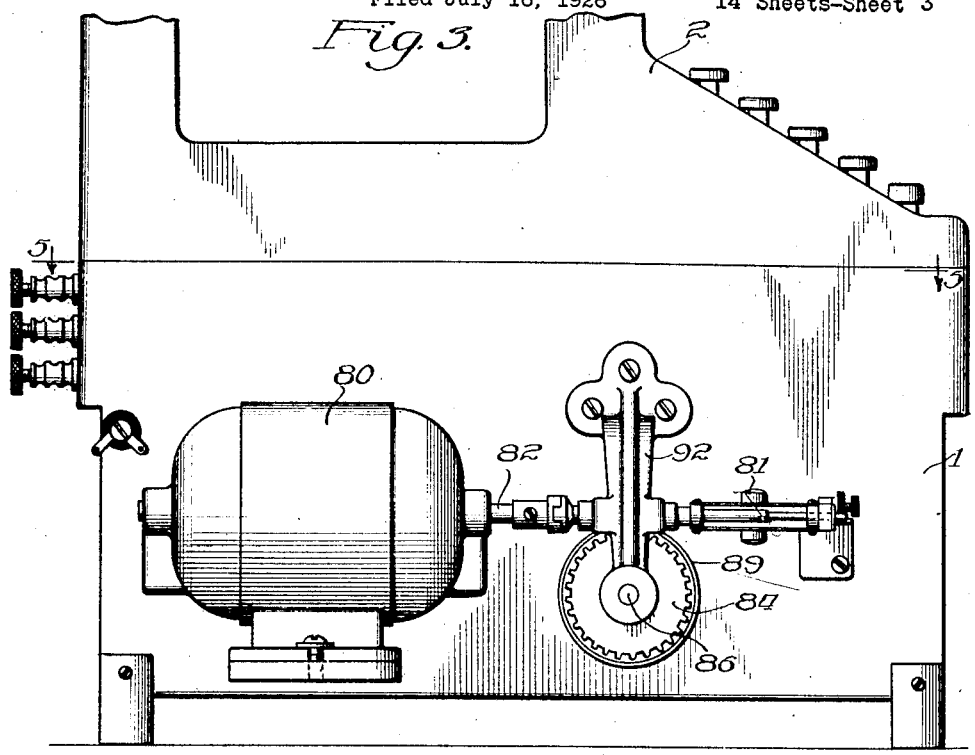
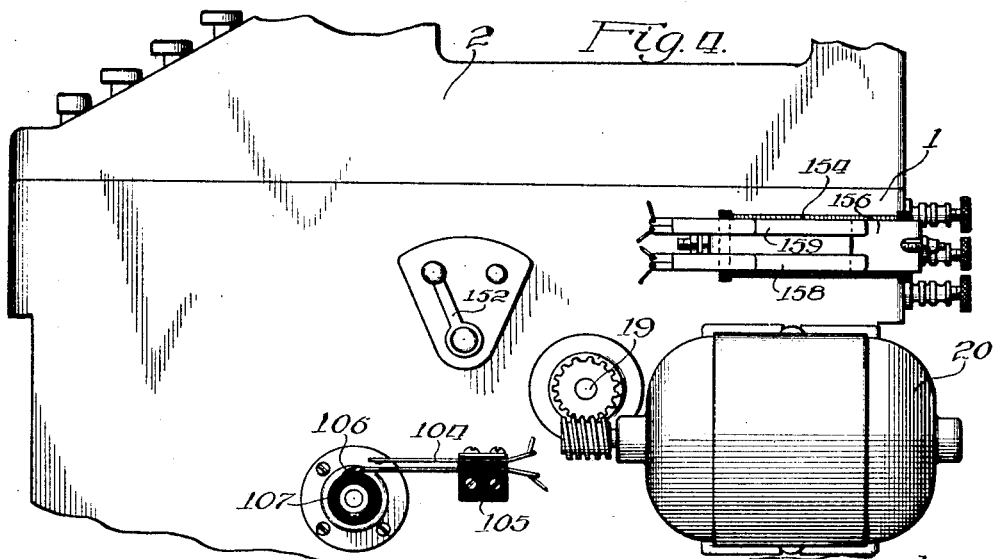
Witnesses.
A. M. Framke.
John E. Titus.
Inventors.
Frank D. Pearne.
Lawrence E. Gotsch.
Rummler & Rummler
Attys.

May 22, 1928.
F. D. PEARNE ET AL
1,670,421
TYPEWRITER TELEGRAPH
Filed July 16, 1926    14 Sheets-Sheet 4
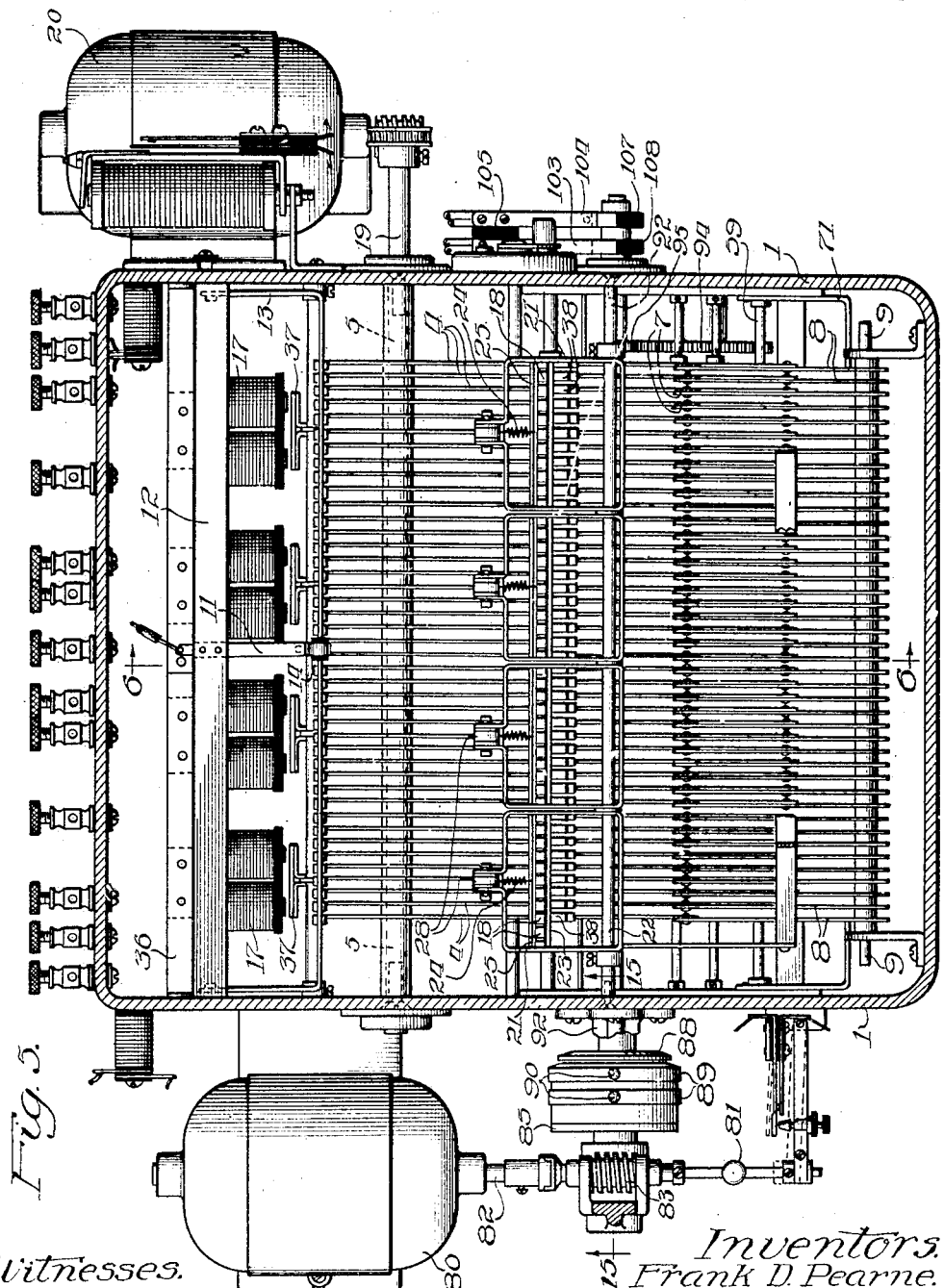
Fig. 5.
Witnesses.
A. M. Framke.
John E. Titus.
Inventors.
Frank D. Pearne.
Lawrence E. Gotsch.
Rummler & Rummler
Attys.

May 22, 1928.  1,670,421
F. D. PEARNE ET AL
TYPEWRITER TELEGRAPH
Filed July 16, 1926  14 Sheets-Sheet 5

Witnesses.
A. M. Framke.
John E. Titus.

Inventors
Frank D. Pearne
Lawrence E. Gotsch
Rummler & Rummler
Attys.

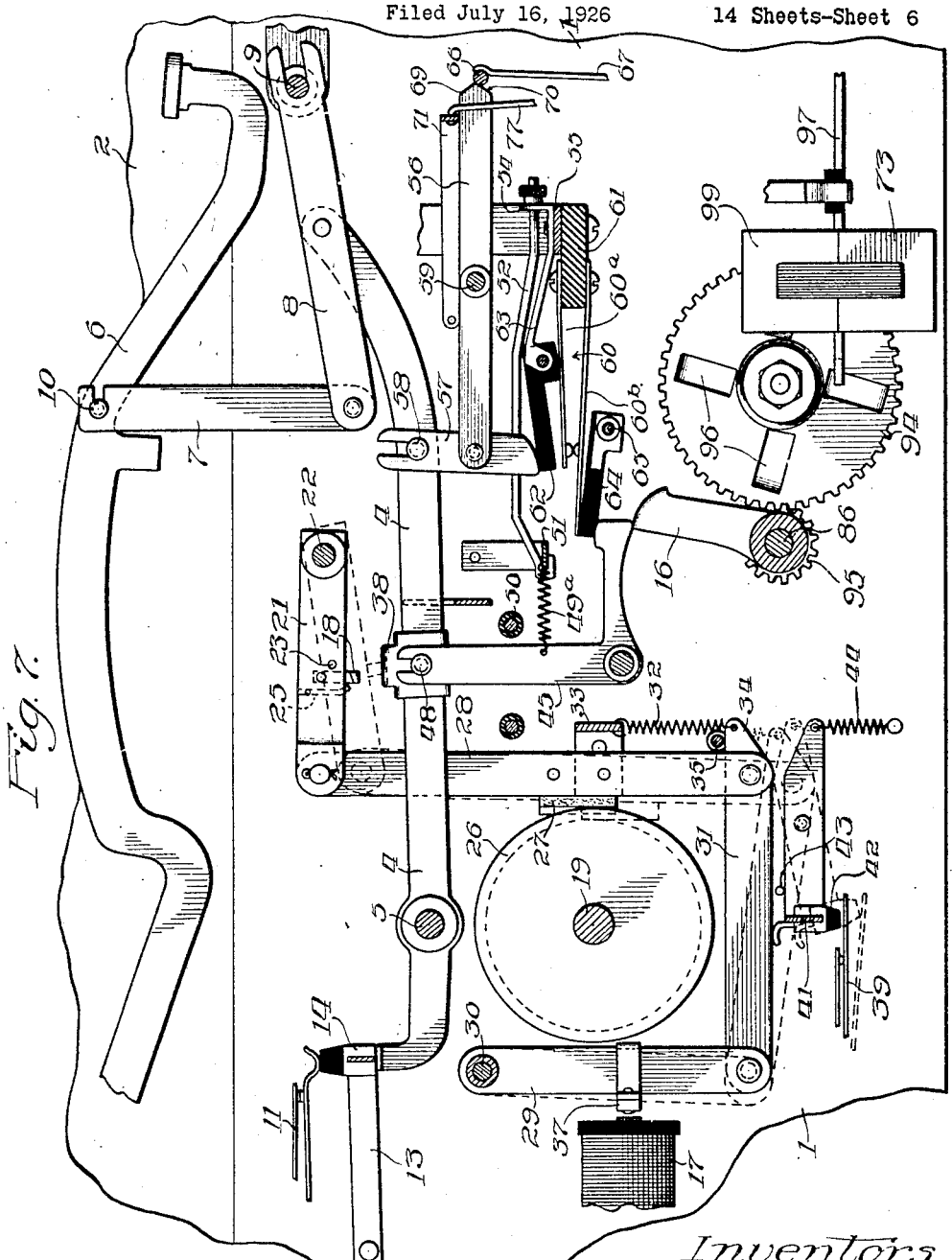

May 22, 1928.
F. D. PEARNE ET AL
TYPEWRITER TELEGRAPH
Filed July 16, 1926
1,670,421
14 Sheets-Sheet 7
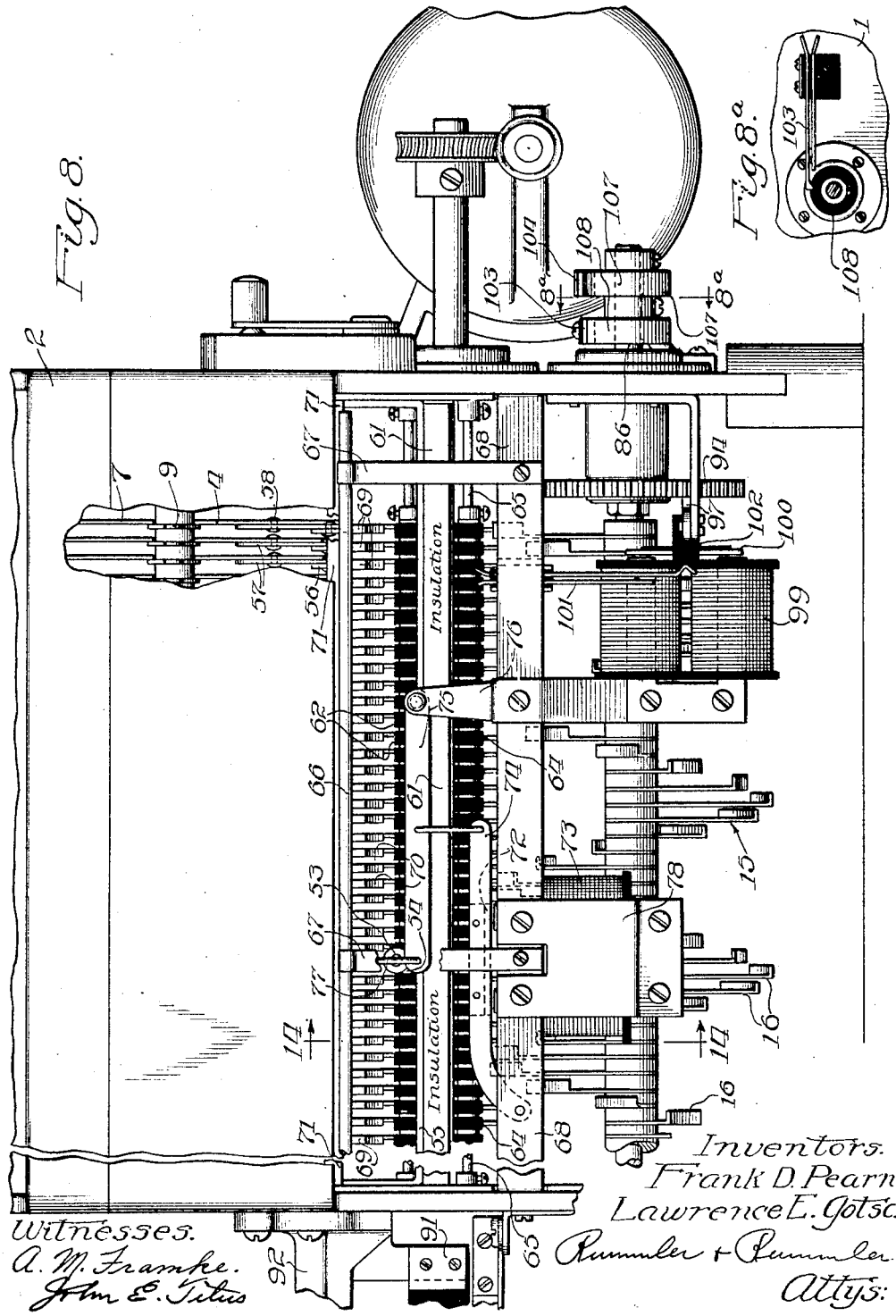
Inventors.
Frank D. Pearne.
Lawrence E. Gotsch.
Rummler + Rummler
Attys.
Witnesses.
A. M. Framke.
John E. Titus.

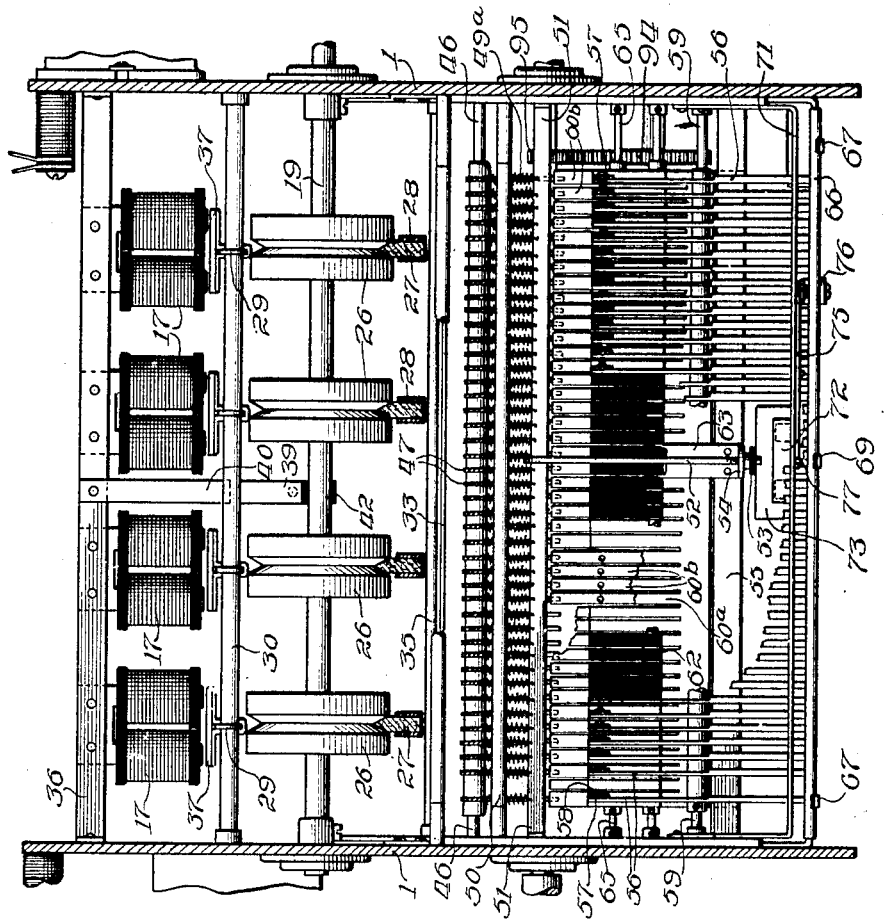

May 22, 1928.
F. D. PEARNE ET AL
TYPEWRITER TELEGRAPH
Filed July 16, 1926
1,670,421
14 Sheets-Sheet 9
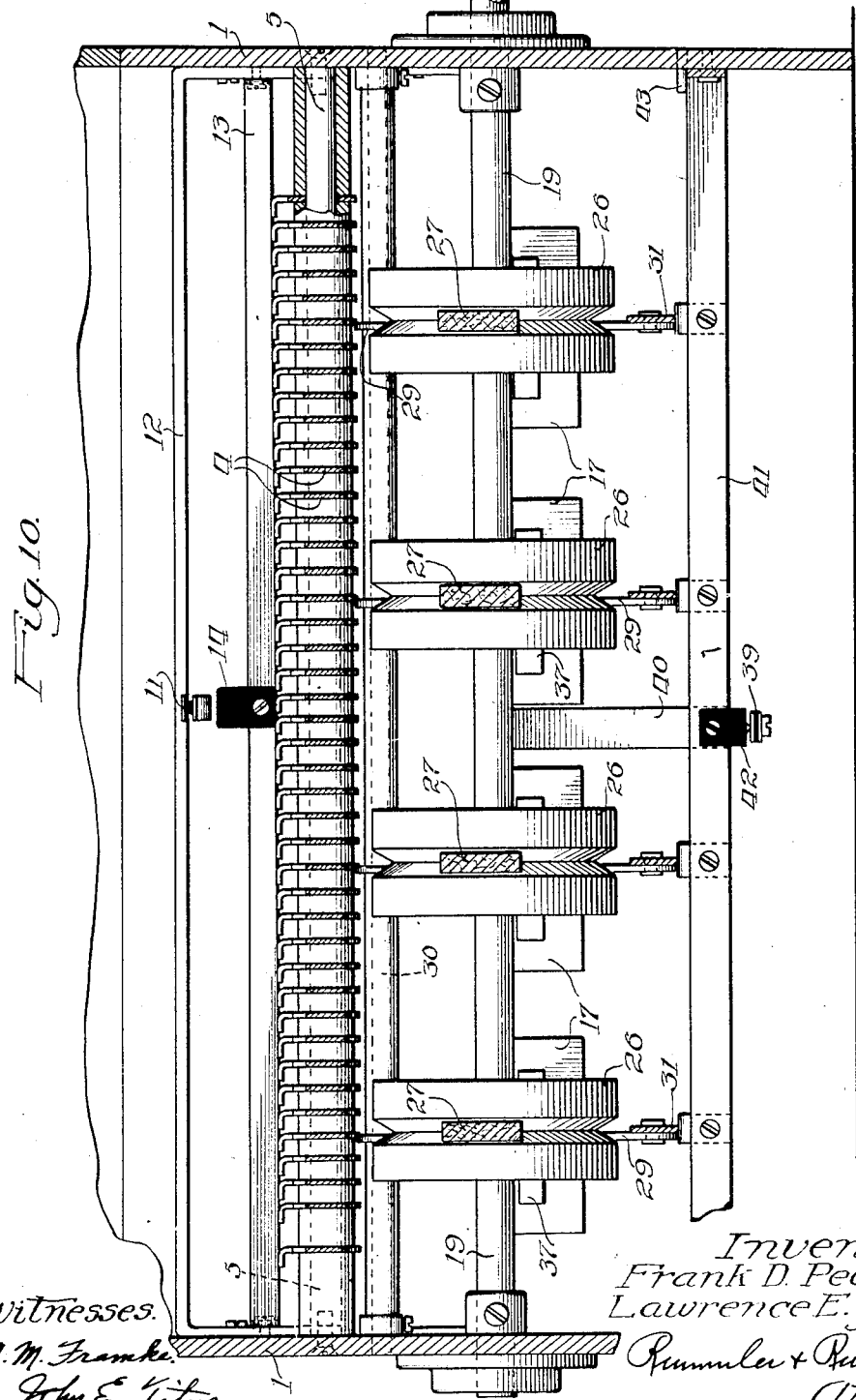
Inventors.
Frank D. Pearne.
Lawrence E. Gotsch
Rummler & Rummler
Attys.
Witnesses.
A. M. Franke.
John E. Titus

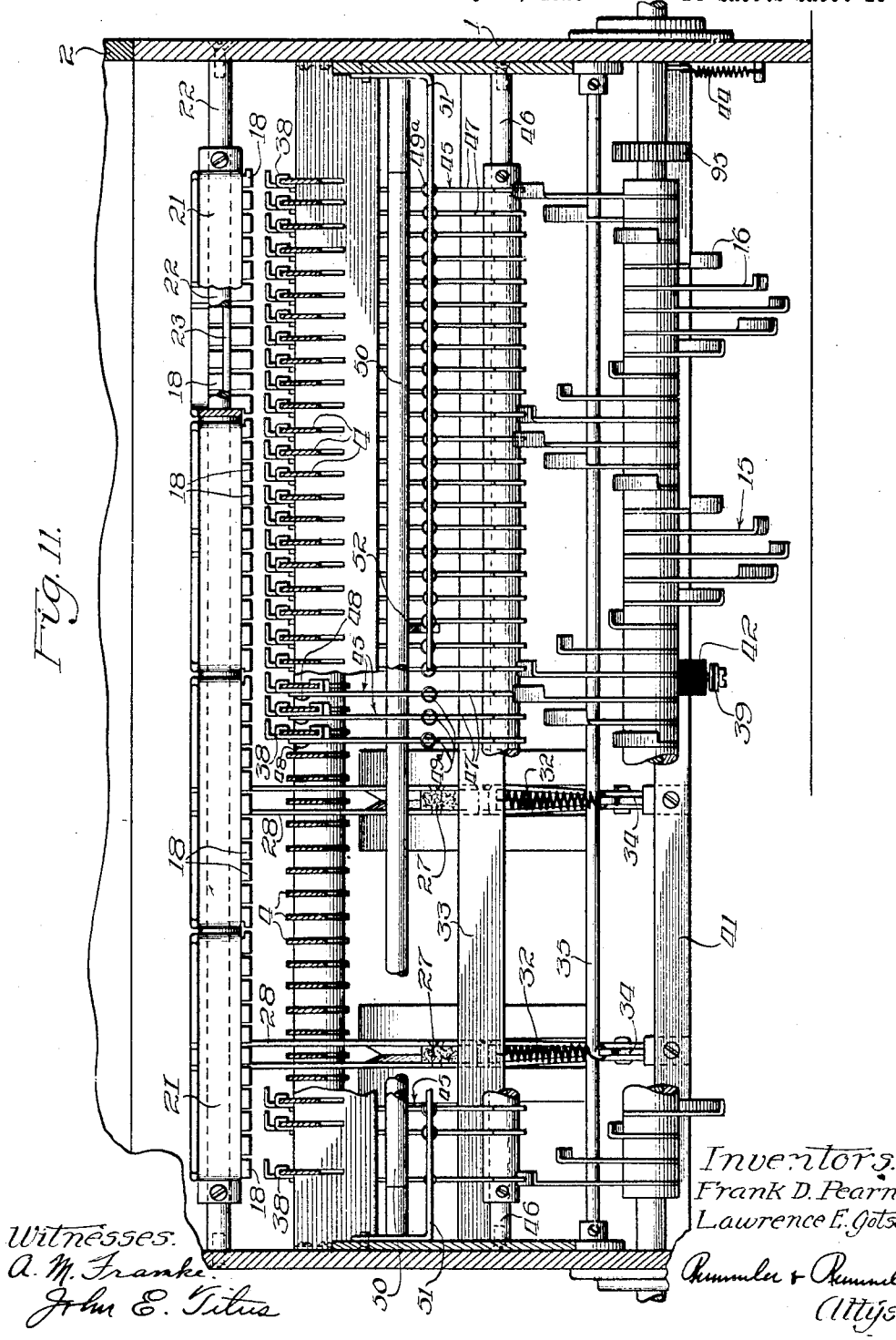

May 22, 1928.　　　　　　　　　　　　　　1,670,421
F. D. PEARNE ET AL
TYPEWRITER TELEGRAPH
Filed July 16, 1926　　　14 Sheets-Sheet 11
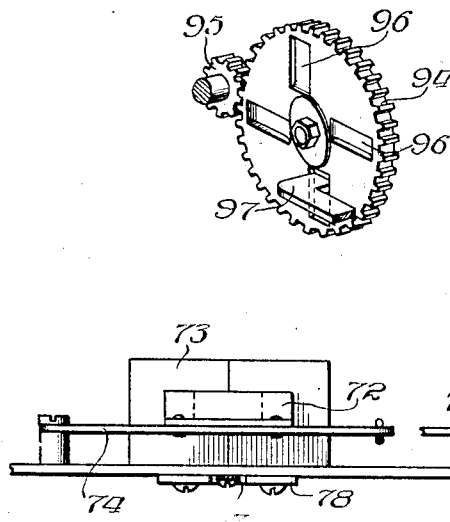
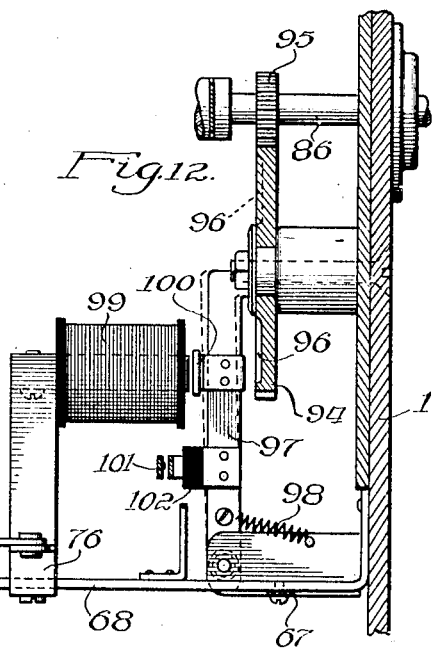
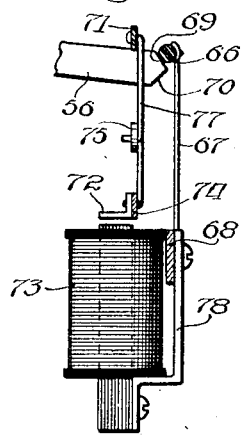
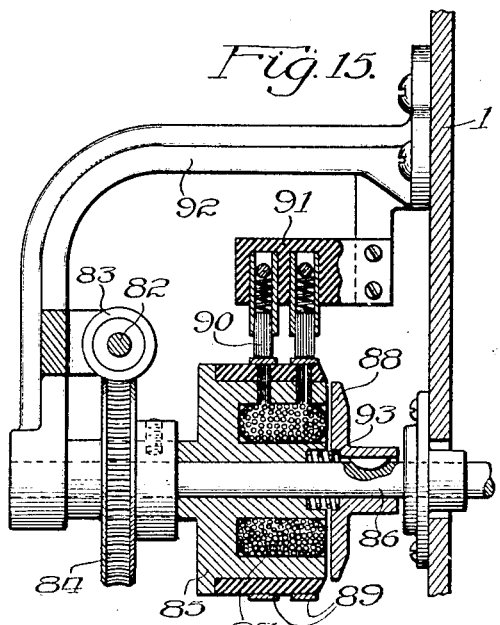
Inventors.
Frank D. Pearne.
Lawrence E. Gotsch.

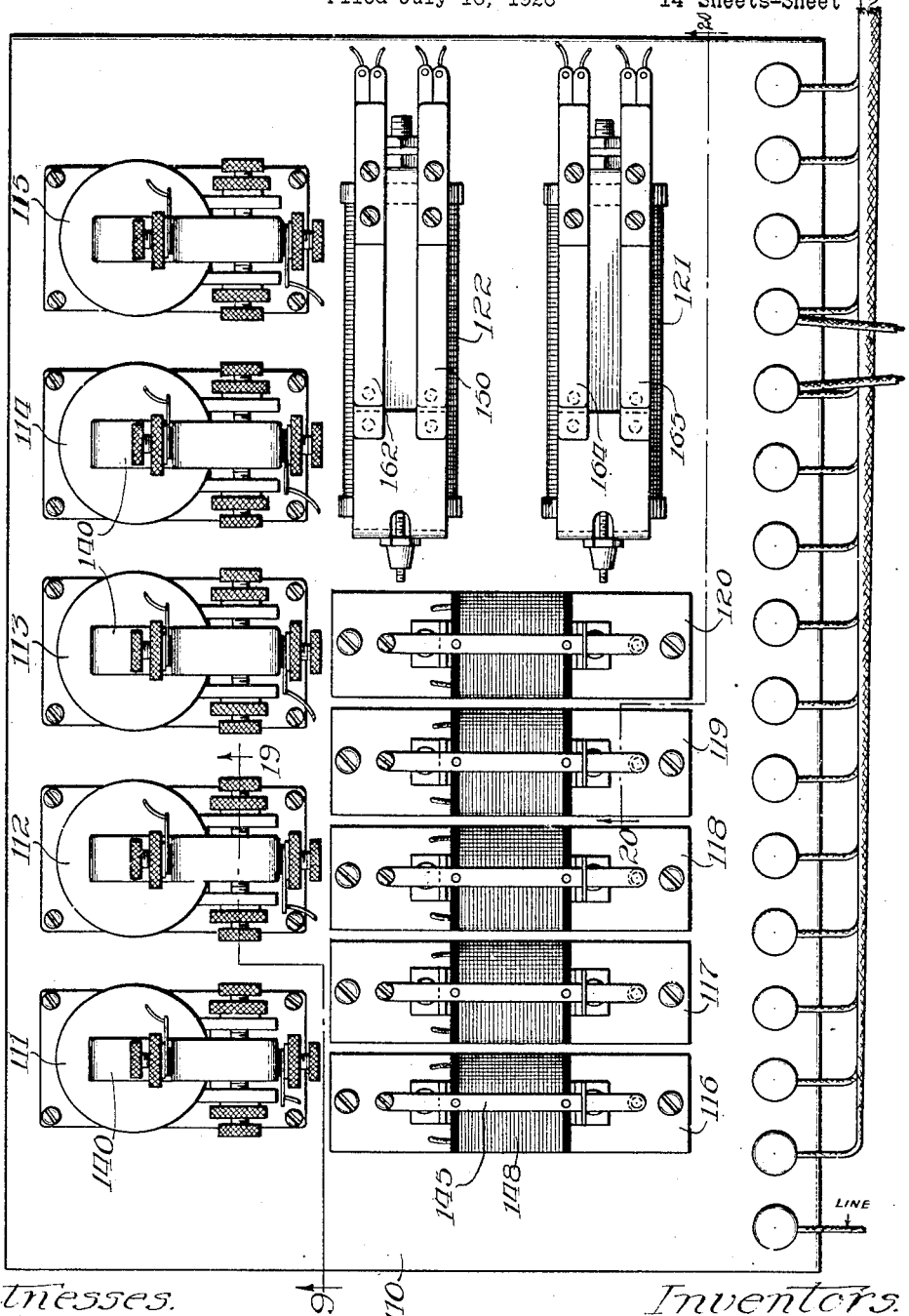

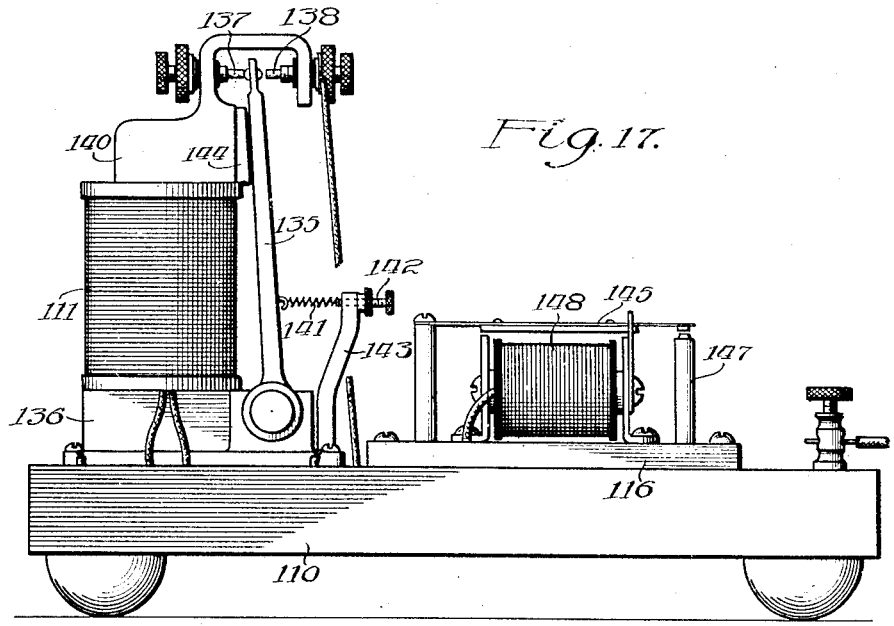
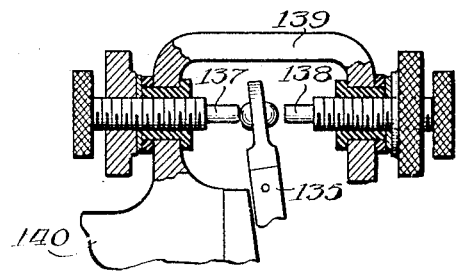

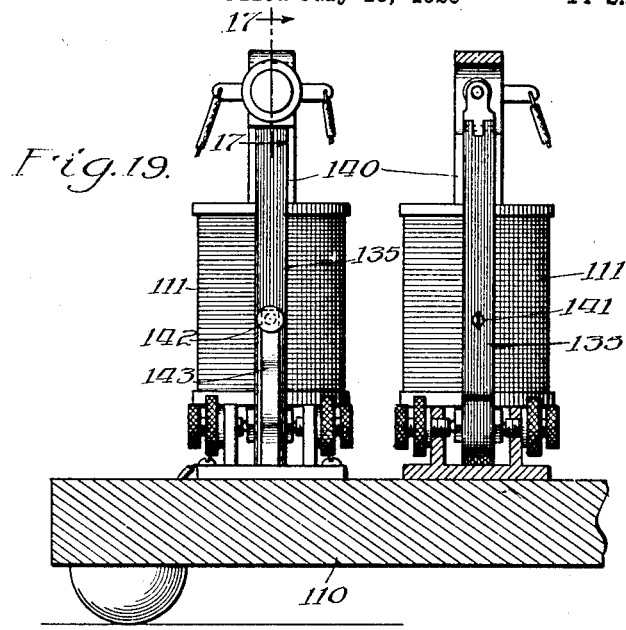
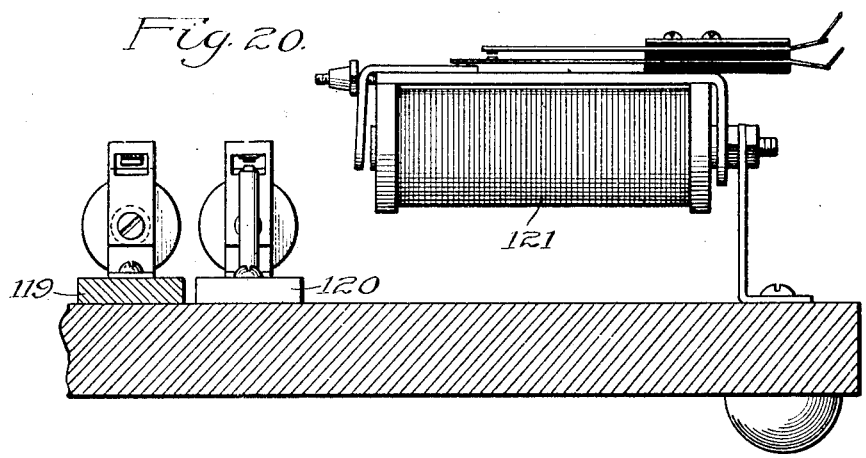

Patented May 22, 1928.

1,670,421

UNITED STATES PATENT OFFICE.

FRANK D. PEARNE AND LAWRENCE E. GOTSCH, OF CHICAGO, ILLINOIS, ASSIGNORS, BY MESNE ASSIGNMENTS, TO WIRE TRANSMITTING CORPORATION, OF CHICAGO, ILLINOIS, A CORPORATION OF DELAWARE.

TYPEWRITER TELEGRAPH.

Application filed July 16, 1926. Serial No. 122,915.

This invention relates to improvements in printing telegraphs, more particularly the typewriter telegraph, wherein one typewriter is caused to respond to the operations of another distant typewriter.

The invention is chiefly characterized by the use of standard typewriters and attaching mechanism connected thereto for producing or utilizing two spaced impulses over a single telegraph line, the impulses being differently spaced for different letters and the character of the second impulse being differentiated to selectively operate printing mechanism for different groups of the letters. The first impulse sets timed distributing mechanism into operation to successively select the individual keys of each group, and the second impulse is timed from the starting impulse at the proper interval to operate the desired key, and is properly proportioned to operate in the group containing the same.

The timing or distributing mechanism starts from zero position at each key operation so that the several distributors are corrected for synchronizing at each operation. In order to increase the interval between successive keys, the keys are divided into groups which are simultaneously effected by the one distributor in each typewriter.

The main objects of this invention are to provide an efficient typewriter telegraphing device which is operable over a single line wire by variably spaced impulses, and substantially independent of the length or duration of any impulse; to increase the speed of operation of such devices; to provide improved means for sending a starting impulse over the line and then changing the connections to make the line responsive to a second impulse; to provide an improved key-locking and releasing device; to provide improved means for connecting the distributor shaft to the constantly driven motor; to provide an improved electromagnetic clutch; to provide improved means for selectively placing the key bars in engageable relation with the trimming actuator; to provide improved means for distributing the contacting for the keys; to provide improved means for selecting one of a group of printing magnets; to provide an improved clutch for attaching the printing mechanism to a constantly driven shaft and to provide such a system whereby the operations are controlled by a few simple relays and locking-up devices, together with a simple system of cam operated switches.

An illustrative embodiment of this invention is shown in the accompanying drawings.

Figure 1 is a circuit diagram of one complete typewriter station.

Fig. 1^A supplements and completes the diagram in Fig. 1 and shows the mechanical relation of parts which cannot be fully shown in Fig. 1 without greatly complicating the diagram.

Fig. 2 is a circuit diagram of two interconnected typewriter stations, the left side showing only the elements used in sending, and the right side showing only the elements required for receiving.

Fig. 3 is a fragmental elevation of the left end of the typewriter.

Fig 4 is an elevation of the right end.

Fig. 5 is a plan section taken substantially on the line 5—5 of Fig. 3 and shows the general arrangement of the telegraphing attachment.

Fig. 7 shows a changed position of the parts illustrated in Fig. 6 as in sending, with dotted line positions for the parts in the receiving machine.

Fig. 8 is a rear elevation of the typewriter with parts broken out.

Figure 6:
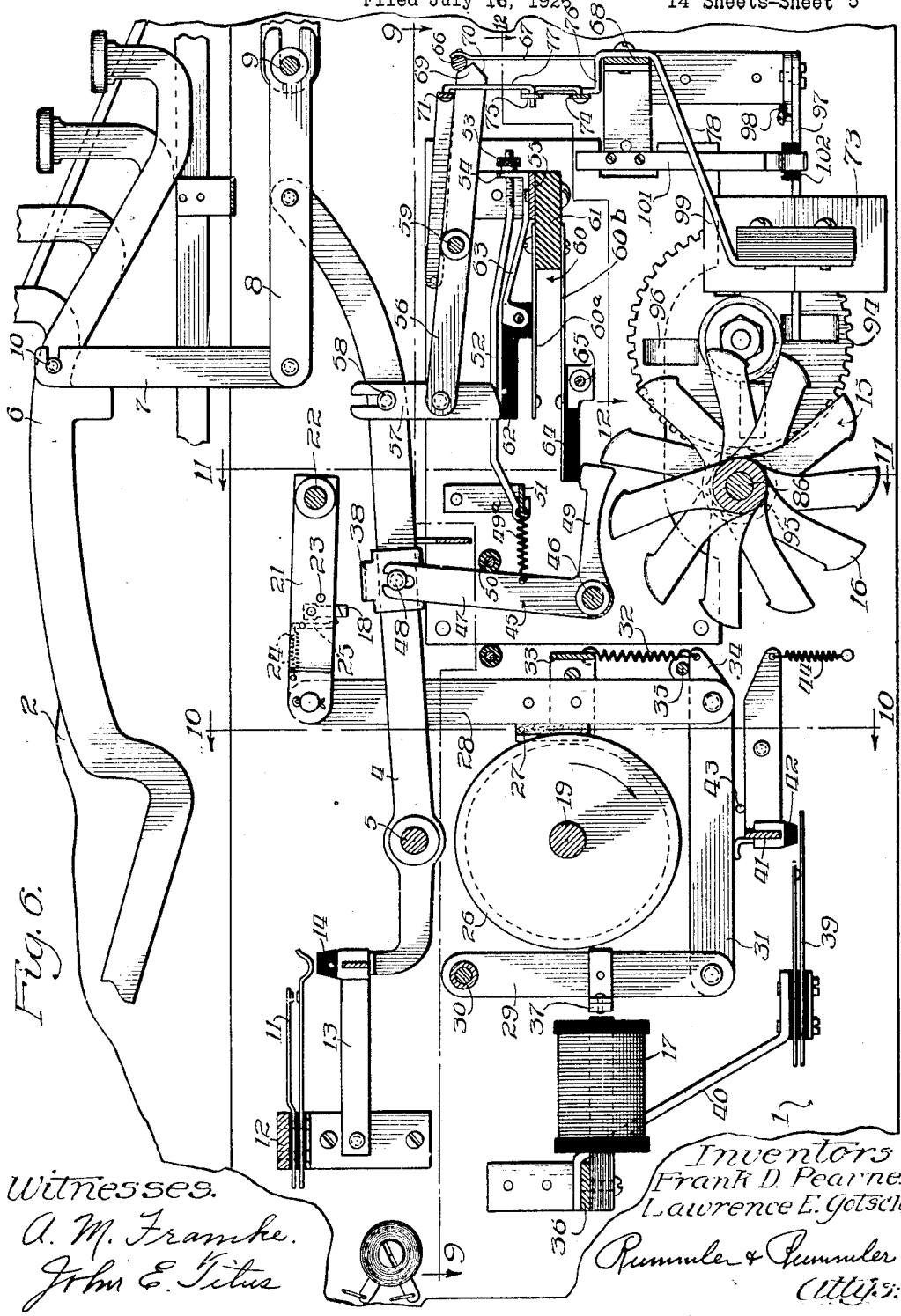
Fig. 6 is a cross section taken on the line 6—6 of Fig. 5.

Fig. 8^A is an end view of the switch operating cams shown at the lower right hand side of Fig. 8.

Fig. 9 is a plan section taken below the operating levers substantially on the line 9—9 of Fig. 6.

Fig. 10 is a sectional elevation taken on the line 10—10 of Fig. 6.

Fig. 11 is a sectional elevation taken on the line 11—11 of Fig. 6.

Fig. 12 is a plan section taken on the irregular line 12—12 of Fig. 6.

Fig. 13 is a perspective view of the distributor drive gear and latch show in Fig. 12.

Fig. 14 is a fragmental sectional elevation taken substantially on the line 14—14 of Fig. 8.

Fig. 15 is a sectional elevation of the clutch mechanism and is taken on the line 15—15 of Fig. 5.

Fig. 16 is a plan view of the relay board and co-assembled parts.

Fig. 17 is an elevation of the left hand of the board.

Fig. 18 is a detailed view of the contacts shown in Fig. 17.

Fig. 19 is a sectional elevation taken on the line 19—19 of Fig. 16.

Fig. 20 is taken on the line 20—20 of Fig. 16.

In this invention a distributor is rotatively mounted in a frame underneath the typewriter and is provided with fingers arranged in four complete spirals, which fingers are respectively related with corresponding key bars of the typewriter. A lever is also provided for each key bar, the levers being pivotally mounted in the frame in transverse relation with the corresponding finger of the distributor. A normally open starting switch is closed by depressing any one of the typewriter keys, which switch connects the distributors to continuously operating synchronized motors, sets up the line for receiving the second impulse when the sending distributor is in cooperative relation with the depressed key, and locks up the local power at the receiving typewriter into connection with the printing magnets, the circuit of the proper magnet being completed by the second impulse. The distributors, in addition to cooperating with the sending keys to time the second impulse, successively operate a contactor in similar timed relation for each lever, which makes the lever in the receiving machine, and the connected key bar, responsive by placing the lever in engageable relation with the actuating device, which is clutch connected to a continuously rotating drum by the printing magnet. That is, when the second impulse is given the printing magnet of the receiving typewriter is actuated at the proper interval to engage and operate the key on the receiving machine which corresponds to the depressed key on the sending machine.

When the distributors of each machine have made one complete revolution they are automatically disconnected and stopped in the same idle positions; and, by means of switches operated by cams on the distributing shaft, the locked circuits are broken and the circuits then put in condition for receiving another starting impulse. One printing magnet is provided for each group of keys related with each complete spiral. The first impulse connects all of the printing magnets to one side of the battery and the second impulse is adapted to select and lock up the circuit of any one of the magnets. This is accomplished by providing four electromagnets, two of which has a constant holding current of opposite polarities and low value, and the remaining two have a high holding current of opposite polarities. The electromagnets are accordingly selectable by different amplitudes as well as by different polarities of the second impulse.

In the drawings the frame 1 is provided underneath the standard form of typewriter 2 and constitutes a support therefor. The key levers 4 are pivotally mounted on the transverse shaft 5 which is secured in the side walls of the frame 1; and each of the levers 4 is connected to the corresponding typewriter key bar 6 by means of the motion reducing links 7 and 8. The links are pivotally connected at one end, the opposite end of the link 8 is pivoted to the rod 9 secured in the frame 1, and the opposite end of the link 7 is pivoted to a pin 10 provided in one side of the corresponding typewriter key bar 6. The front ends of the levers 4 are pivoted to the medial portions of the respective levers 8. The lever 4 is held in the normal position shown in Fig. 6 by the return spring and stop mechanism of the corresponding typewriter bar 6.

When any one of the keys of the typewriter or the space bar is depressed, the normally open starting switch 11 is closed. The switch 11 is mounted on the cross bar 12, secured to the frame 1. The rear ends of the levers 4 bear against a bail 13, which is pivotally mounted in the frame 1. An insulating contactor 14 is mounted on the center of the bail to bear against the lower leaf of the switch 11 for closing the same. Normally the bail 13 is resting on the rear ends of the levers 4 with the contact block 14 disengaged from the switch 11.

The distributor wheel 15 is rotatably mounted in the frame 1, below and in transverse relation with the bank of levers 4. The wheel comprises a plurality of spirally disposed cam fingers 16, which are arranged in four complete spirals, one finger being provided for and related with each of the levers 4. In this manner the forty-two keys of the typewriter are divided into four groups; ten, including the space bar, in the first group; and eleven in each of the three remaining groups. The distributor is given one complete turn at each key operation, and, by arranging the fingers in four complete spirals, the cycle is divided into only eleven intervals instead of forty-two, as would be required if the keys were not grouped. This permits greater speed of operation without shortening the intervals in which different elements are required to act.

Since the distributor wheel 15 is turned one complete revolution at each key operation, as will be described hereafter, the distributor constitutes a timer for selecting the different keys of each group at different intervals from the starting impulse. Then, to select a group, four printing magnets 17 are provided, one in each group, to connect the corresponding key actuator bar 18 to the constantly rotating shaft 19. The shaft 19 is rotatively mounted across the frame and is driven by the small motor 20, which is mounted at the right side of the frame 1, and connected directly to local power. The bars 18 are pivotally mounted in bail frame members 21, which are pivoted on transverse rod 22, secured between the side walls of the frame 1. The bars 18 are yieldingly pressed forward against stop pins 23, in the bail 21, by means of the spring 24 which is attached to the rear portion of the frame 21 and to the upper portion of a plate 25, which is pivoted in the frame 21 and bears against the lower side of the bar 18. For each printing mechanism the shaft 19 is provided with a grooved brake drum 26, which is adapted to be frictionally engaged by a fibre block 27 secured in the depending lever 28, which is pivotally connected to the swingable end of the corresponding actuator bar frame 21, and hangs directly in front of the brake drum 26. The lever 29 is dependingly pivoted on a stationary cross rod 30 secured in the frame and is located directly behind the drum 26. The lower ends of the levers 28 and 29 are pivotally connected to the opposite ends of the connecting link 31. Then the rear end of the frame 21 is resiliently urged upward by means of a spring 32, which is connected to a stationary cross bar 33 and is attached to the extended end 34 of the link 31; a stop is provided by means of a fixed transverse rod 35, which is contacted by the upper edge of the link 31.

The printing magnets 17 are fixedly mounted on a stationary frame cross bar 36 in positional relation to the link 29 of the corresponding group actuator. An armature 37 is attached to the medial portion of the link 29, so that when the printing magnet 17 is energized the block 27 of the lever 28, which is linked to the lever 29, is drawn into contact with the rotating brake drum 26. The lever 28 is thereby pulled downwardly into the position shown in dotted lines in Fig. 7, so that the actuator bar 18 engages with a contactor member 38 to depress the corresponding lever 4 and operate a key for printing. In the lower portion of the downward movement of link 31 a normally closed switch 39 is opened to break the circuit in the printing magnets 17 and release the actuator from the brake drum 26 and the actuator mechanism is then returned to normal position by means of the spring 32. The downward movement is, of course, stopped by the typewriter key striking the platen.

The switch 39 is stationarily mounted on the lower end of a bracket 40, which is attached to the cross bar 36 and is commonly actuated by the link 31, in each of the four actuator mechanisms, which links contact with the transverse portion of a bail 41, which is pivoted in the side of the frame 1 and is provided with an insulating contact block 42 for separating the leaves of the switch 39. The bail 41 is resiliently held upward against the stop pins 43, secured in the frame 1, by means of the contractile spring 44.

The levers 4 of each group, are successively rendered engageable by the actuating bar 18 by means of the contactor blocks 38, which are slidably mounted on each bar 4 and shifted by bell crank levers 45. The bell crank levers 45 are pivotally mounted on a stationary transverse rod 46, secured into the side walls of the frame 1. The upper arm 47 of each crank 45 is slotted and engages a pin 48 in the contact slide 38, and the horizontal arm 49 is engaged by the corresponding one of the distributor cam fingers 16 to rotate the crank counter clockwise, as viewed in Fig. 6, to move the contactor 38 from the position there shown to the position shown in Fig. 7, where it is in engageable relation with the bar 18. Normally the contact 38 is held forwardly by means of a spring $49^a$, which draws the vertical arm 47 into contact with a fixed transverse rod 50. The spring $49^a$ extends between the arm 47 and a transverse bail 51, which is dependingly pivoted in the side walls of the frame 1, and is adjusted to tension the springs $49^a$ by means of a rod 52, which hooks onto the transverse portion of the bail 51 and is held by a nut 53, threaded on the front end of the rod 52, bearing against an upright bracket 54 secured to the fixed transverse support bar 55.

A horizontal lock lever 56 for each lever 4 is pivoted to a vertical lever 15, which is slotted at the upper end and engages a pin 58 in the corresponding lever 4. The medial portions of the lock levers 56 are pivoted on a stationary transverse rod 59 secured in the side walls of the frame 1.

Since keys are simultaneously effected in different groups an arrangement is made whereby the sending circuit for only the depressed key is completed. This is accomplished by providing a sending switch 60, one for each key, which is rigidly mounted on a fibre block 61 secured to the cross frame member 55. The switches are adapted to be partially closed by the distributor member 15, and partially closed by depressing the key, so that cooperation is required between a depressed key and a distributor finger to completely close the switch. The upper leaf $60^a$ is pressed downwardly by means of a pivoted insulating block 62, which is pivotally supported in a bracket 63 attached to the support 55, and engages the lower end of the vertical bar 57, which is connected to the lever 4. The lower leaf 60$^b$ rests on the pivoted insulating block 64, which is pivotally mounted on a stationary transverse rod 65, secured in the frame, and bears against the upper surface of the end of the horizontal bell crank arm 49. As shown in Fig. 7, the lever and the distributor arm each press the corresponding switch leaf part way to close the switch, and the simultaneous operation of both the lever and the distributor arm is required to bring the leaves 60$^a$ and 60$^b$ into contact to close the switch. The pivoted blocks 62 and 64 are provided to furnish a degree of resiliency to avoid a solid connection which might break some of the operating members.

The depressed key is locked down until the distributor wheel has finished its revolution by means of the rod 66, which is yieldingly supported by the spring arms 67, attached to the fixed frame bar 68, to bear against the upper angular surface 69 of the pointed end of the locking lever 56 in the normal position. When a lever is depressed, as shown in Fig. 7, the point of the lock lever 56 is raised above the detent rod 66, so that the rod bears against the lower angular surface 70, and thereby yieldingly holds the lever mechanism in the depressed position. A bail 71 is swingingly pivoted to the side walls of the frame 1, with the transverse portion resting on the upper edges of the lock levers 56. The armature 72 of the release magnets 73 is mounted on a lever 74, which is pivoted to the frame bar 68. The outer end of the lever 74 is linked to the middle portion of the lever 75, which is pivoted at one end to a bracket 76 secured to the frame member 68, and the outer end of the lever 75 is in turn linked to the transverse portion of the bail 71 by means of the link 77. Near the end of the revolution of the distributor wheel, the magnets 73 are energized, as will be described hereinafter, to pull downwardly on the bail 71 and force the raised link 56 back to normal position below the cross bar 66. The magnets 73 are supported by means of a bracket 78, which is attached to the frame member 68, as best shown in Fig. 6.

The driving mechanism for the distributor shaft is as follows: A constantly driven motor 80 is mounted on the left side of the frame 1, and is provided with a speed governor 81, which is mounted on the outer end of the motor shaft 82. The governor may be of any well known type, and serves to run the distributor operating motors 80 of each machine, substantially in synchronism. The worm 83 is fixed on the motor shaft 82 and meshes with the worm gear 84, which is fixed on the hub of the brake drum 85. The drum is free to rotate on the extended end of the shaft 86 of the distributor wheel 15, and is provided with an energizing coil 87, which is recessed in the inner face of the drum. When the coil 87 is energized the flange 88, keyed to the shaft 86, is drawn into driving frictional contact with the face of the drum 85. Contact rings 89 are insulatingly mounted on the periphery of the brake drum 85, and are connected to the opposite terminals of the coil 87. The current is communicated to the rings 89 through the brushes 90, which are stationarily mounted in an insulating block 91, secured to the support bracket 92, which in turn is attached to the adjacent wall of the frame 1. To assist in disengaging the brake members 85 and 88, a spring 93 is mounted in recesses provided in said members, around the shaft 86.

For latching and releasing the distributor wheel, a spur gear 94 is rotatably mounted in the lower right hand portion of the frame 1 and meshes with a pinion 95 which is fixed on the distributor shaft 86. The pinion 95 is one-fourth the size of the gear 94, and consequently the gear is turned one-fourth of a revolution at each complete revolution of the distributor wheel. The inner face of the gear 94 is provided with four quadrantly arranged radial slots 96, which are engaged by the angular end of the latch lever 97, which is pivoted to the frame 1 and has the outer end urged into contact with the side of the gear 94 by means of the contraction spring 98. The releasing magnet 99 is supported from the cross frame member 68 in position to attract the armature bar 100, which is attached to the lever 97. When the magnet 99 is energized the end of the latch lever 97 is withdrawn from a slot 96 and rides on the surface of the wheel 94, under the tension of the spring 98, until the succeeding slot moves into relation with and is engaged by the end of the lock lever.

When the latch lever 97 is in retracted position, that is, disengaged from one of the holding slots 96, the lever closes a normally open clutch switch 101, which is mounted on the frame bar 68. A fibre block 102 is attached to lever 97 in position to engage with the adjacent spring leaf of the switch 101 and press that leaf into contact with the opposite leaf for closing the switch.

Two cam operated switches 103 and 104 are supported on an insulating block 105, attached to the side of the frame 1. The outer switch 104 is normally open and is closed by the projection 106 on the cam 107, secured to the distributor shaft 86, just before the revolution of the distributor wheel is completed. The inner switch 103 is closed when the distributor wheel is stopped. The upper leaf of this switch is provided with a projection which, in stopped position, engages in a notch in the surface of the circular cam member 108, secured to the shaft 86, to allow the switch to close, and to open the switch when the cam is rotating.

On the relay board 110, one of which is provided for each typewriter, are mounted the printing circuit magnets 111, 112, 113, 114 and the starting magnet 115; also the corresponding lock-up magnets 116, 117, 118, 119 and 120 and the relay switches 121 and 122.

The first four line magnets are continuously energized by current from the holding power battery 123, connected as shown in Fig. 1. Preferably a twelve volt battery is used, with the positive terminal connected through the holding winding 111ª of the magnet 111, then through the holding winding 112ª of the magnet 112, back to the negative terminal of the battery 123. The windings 111ª and 112ª are wound in opposite directions so that the polarities of the two corresponding line magnets are opposite, but are of the same value. The windings 113ª and 114ª of the two magnets 113 and 114 are similarly connected to the holding battery 103, but through a resistance 124, which causes the magnets 113 and 114 to be equally and oppositely energized, but at a lower amount than the two magnets 111 and 112. The line 125 connects through the releasing windings 126 of the first four magnets, in series, and through the single winding 127 of the clutch operating line magnet 115, to the movable arm 128 of the two-pole switch 129. As shown in Fig. 1, the switch lever 128 is connected to a grounded terminal 130, which places that set in condition for receiving.

The respective holding currents of the first four line magnets are so proportioned that an impulse from the one hundred volt positive terminal 131, in the sending set, de-energizes the first magnet 111; the impulse from the fifty volt positive terminal 132 de-energizes the fourth magnet 114; the impulse from the fifty volt negative terminal 133 de-energizes the magnet 113; and the negative one hundred volt terminal 134 de-energizes the magnet 112. The line magnet 115 is normally de-energized, and is energized by all impulses from the line 125.

The armatures 135 of the line magnets are vertically mounted and pivoted to the bases 136 of the respective magnets. The upper ends of the armature levers 135 operate between insulated contact points 137 and 138, which are adjustably mounted in the yoke 139, which is an extension of the magnet core 140. The pull of the magnet is opposed by a contractile spring 141, which is attached to the levers 135 and to an adjusting screw 142, which is threaded into the upper end of the upright arm 143 which is mounted on the base.

In the type of magnet shown, the inner contact point 137 is adjusted so that the arm 135 is held slightly out of actual contact with the pole face 144, and the spring 141 may be given a comparatively strong tension to provide for quick acting.

Having described the general mechanical construction, the operating circuits will now be described: The outer contacts 138 of the first four line magnets are connected respectively to the armatures 145 of the corresponding lock-up magnets 116 to 119, and the inner contact 137 of the fifth magnet 115 is connected to the armature 145 of the magnet 120. The local battery 146 is connected from the positive terminal to the armature lever 135 of the first line magnet 111. In the holding position the armature lever 135 then connects to the inner contact 137, which is connected to the armature levers 135 of the succeeding magnet, through the inner contact of the same magnet to the next armature lever and contact to the armature lever 135 of the fourth magnet 114, where the connection ends, since no connection is made to the inner contact 137 of the fourth line magnet.

The positive side of the battery 146 also connects to the contact posts 147 of the lock-up magnets 116 to 120 inclusive. Each of the windings 148 of the first four lock-up magnets is connected from the respective armature 145, through the coil to one terminal of each of the printing magnets 17 respectively. Thus when, for example, the magnet 118 is locked up, the battery 146 is connected through the armature and the winding of the magnet to one side of the third printing magnet 17.

When the line magnet 115 is energized by a line impulse, the corresponding lock-up magnet 120 connects to positive terminal of the battery 146 through the armature 145 and the magnet winding 149 to one terminal of the latch release magnet 99.

The function of the five line magnets and the corresponding lock-up magnets may now be seen. The first four magnets are effective for selectively energizing the four printing magnets, and the fifth magnet is for energizing the latch release magnet 99 to release the distributor wheel 15.

The positive terminal of the local battery 146 is also connected to one side of the universal key switch 11 and the one terminal of the lever releasing magnet 73 and to the switch 39. The negative terminal of the battery is connected to the relay 122 and through the relay switch 150, through the relay 121 around to the upper arm of the switch 11, so that when switch 11 is closed, the relay 121 is energized momentarily through the closed switch 150 of the relay 122, through the windings of the magnet 121, through the key switch 11, back to the opposite side of the battery 146.

The negative side of the battery 146 is also connected to one of the brushes 90 of the clutch 85, through the windings of the clutch and out through the opposite brush 90 to one terminal of the clutch switch 101, which is closed when the latch 97 is retracted. When the switch 101 is closed, connection is then continued around to the positive side of the battery by means of the line 151. The opposite terminal of the latch magnet 99 is connected to the movable switch arm 152, which connects either through the windings 153 of the magnet 154, to one side of the normal open switch 103, or directly to said switch 103. In the receiving set the switch arm 152 is positioned to connect through the coil 153, and in sending position is connected directly to the switch 103, so that the magnet 154 is then cut out.

The magnet 154 is provided with a holding coil 155 and operates an armature 156 against the action of a spring 157 to close the two switches, 158 for the holding coil 155, and 159 to close the negative side of the printing magnets to the negative terminal of the battery. The holding coil 155 is connected from a switch 158 and to the negative side of the battery 146.

The lever release magnet 73 connects with the open switch 104 to the negative terminal of 146.

The relay 122 attracts the armature 160 against the pull of the spring 161 to open the switch 150 and to close the switch 162. The other relay 121 operates its armature 163 to close a line switch 164, and a switch 165 for the relay 122.

The sending battery 166 comprises four 50 volt units which are connected in series and grounded between the second and third units. In this manner the terminal 131 is made a positive terminal for 100 volts; the terminal 132 is 50 volts positive; 133 is 50 volts negative; and 134, 100 volts negative.

The upper leaves 60ª of the sending switches 60 are connected together and to the connection 167, which leads to one side of the switch 164 and to the sending contact 168 of the hand operated switch lever 128. The lower leaves 60ᵇ are connected together in each of the four groups; the first group of contacts 60ᵇ is connected to the terminal 131, the second to terminal 134, the third to 133, and the fourth to plus 50, or 132. The terminal 132 is also connected to the switch 164 for making the first impulse. When any one of the switches 60 are closed, the second impulse is given from the corresponding battery, through the switch contact 168 out to the line, when the lever 128 is in sending position, contacting with 168.

The relation of electrical parts shown in Fig. 1 to the corresponding mechanical elements is shown in Fig. 1ᴬ, which supplements and completes the diagram in Fig. 1.

The operation will now be described, referring especially to Fig. 2. When the key switch 11, in the sending machine at the left, is closed, current from the local battery 146 is communicated through the windings of the relay 121, through the normally closed switch 150 to the opposite terminal of the battery. This momentarily closes the switches 164 and 165. An impulse from the battery connection at 132 is communicated through the switch 164 to the line, through the switch lever 128, which is in sending position, which impulse passes through the windings of all of the line relay magnets of the sending machine, and also the line relays for the receiving machine, whence the line is connected to the ground through the switch lever 128 in receiving position, which completes a circuit back to the ground of the sending battery 166. The first impulse energizes both line magnets 115 to lock up the armature 145 of the magnets 120. This simultaneously energizes both of the latch releasing magnets 99 to retract the latches 97 and close the clutch switches 101 of both machines. The distributors 15 are then simultaneously connected to the synchronously operating motors 8 of each machine. When the switch 165 is closed by the magnet 121 the relay 122 is energized. This breaks the circuit for the first relay 121 by opening the switch 150, and closes the switch 162 for holding the relay 122 energized. Thereby the line is momentarily connected for receiving the first impulse, and then the relay 122 is locked up through the key switch 11 to hold the switch 150 open until the depressed key is released. Then, when the circuit for the depressed key is closed by the distributor closing the corresponding switch 60, the corresponding battery connection is made to the line to send out the second impulse, since the switch arms 60ᵇ are all connected to the line and the battery 166 is grounded. When the distributor 15 in the sending machine has completed one revolution the switch 104 is momentarily closed to energize the key releasing magnet 73, which causes the switch 11 to be opened. The switch 103 for the latch release magnet 99 is again closed by the operation of the cam 108.

The operations in the receiving machine are as follows: The first impulse energizes the line magnet 115, which attracts the corresponding armature 135 to close and lock up the magnet 120, which connects the local battery power through the switch lever 152, which is then in position to energize the coil 153 of the magnet 154 through the normally closed switch 103. As soon as the distributor 15 starts to move, the latch 97 closes the switch 101, the circuit for the coil 153 is broken by the switch 103, but the magnet 154, having been energized, closes the switch 158 for the holding coil 155, and the magnet 154 remains energized to close the printing magnet switch 159, which connects one side of the printing magnet to the negative terminal of the battery 146, and holds the magnets in condition to respond to the second impulse.

The second impulse de-energizes one of the first four line magnets which energizes the proper lock-up magnet to close the circuit to the local battery for actuating the selected lever.

The first line magnet 111 is energized by the holding power battery 123 so that a one hundred volt positive impulse, from the battery terminal 131 is required to de-energize that special magnet. When the magnet is de-energized the corresponding armature 135 is retracted against the contact post 138 by the spring 141. This closes a circuit from the positive terminal of the local battery 146, through the armature 135, to the post 138, through the coil 148 of the first lock-up relay, through the first printing magnet 17, through the switch 159 which is then held closed, and back to the negative side of the battery 146.

As explained above, the magnet 17 clutches the actuator bar 18 to the constantly rotating drum 26. This causes the actuator to strike the contactor 38 of the lever 4 to operate the key 6 of the receiving typewriter which corresponds to the depressed key 6 of the sending typewriter, since the distributor wheels of both typewriters are synchronously operating to move the contactors 38 as well as the lower switch leaves 60$^b$ of the corresponding keys at the same intervals. The contactor in the sending machine and the switch 60 in the receiving machine are, of course, of no effect.

The switch 39 is opened by the movement of any of the actuators and serves to break the holding circuit through the coil 155 so that the armature 156 is returned to normal position by the spring 157. This opens the switch 159 and opens the circuits of the printing magnets and the lock-up relays.

As described above the first line magnet is deenergized by a one hundred volt positive impulse from the terminal 131. Then the second magnet 112 requires an impulse from the one hundred volt negative terminal 134, which is connected through the second group of keys by the second spiral of the distributor; and the second line magnet locks up the local circuit for the second printing magnet 17.

The third line relay 113 is de-energized by an impulse from the fifty volt positive terminal 132; and the fourth, 114, from the fifty volt negative terminal 134.

When it is desired to change the relation of the two machines the two switches 152 and 128 of each machine are set into opposite position to the position shown in Fig. 2.

An illustrative embodiment of the invention has been shown and described. Many alterations and omissions may be made without departing from the spirit of the invention, as defined in the following claims:

I claim:

1. In a telegraph, a group of pivotally mounted printing levers, one actuator for the group of levers, a contactor for each lever movable into engageable relation with the actuator, means for operating all the contactors in succession, and means for operating the actuator at the instant the contactor of a selected printing lever is in said engaging relation.

2. In a telegraph, a group of pivotally mounted levers for printing, a movable bar, a contactor for each lever movable into engageable relation with the bar, means for moving all the contactors in succession and means for moving the bar at the instant the selected contactor is operated to operate the corresponding lever.

3. In a telegraph, an actuating bar, a group of printing levers, a slide mounted on each lever and movable into engageable relation with the bar, means for successively moving all the slides into and out of said engageable relation, and means for operating the bar at the instant the slide on a selected lever is in engaging relation with the bar.

4. In a telegraph, a continuously rotated drum, a pivotally mounted striker frame for printing, the frame resiliently held in the idle position, a depending lever pivoted to the swinging end of the frame and having a friction surface in engageable relation with the drum, and an electromagnet for swinging the depending lever to engage the friction surface on the drum.

5. In a telegraph, a printing lever striking device comprising a continuously rotated drum, a movable striker resiliently held in the idle position and frictionally engageable with the drum, and an electromagnet for causing said elements to engage to operate the striker.

6. In a telegraph, a lever for printing, an electrically operated actuator, a contactor for each lever movable into engageable relation with the actuator, a pivotally mounted crank in engagement with each contactor, a wheel having spirally arranged teeth for successively operating the cranks for moving the contactors, and means for operating the actuator when the contactor of a selected lever is moved into engageable relation.

7. In a typewriter telegraph, a typewriter having key bars for printing, a switch in mechanical relation with each key bar, a connection from each key bar for partly closing the corresponding switch, and mechanical means for partially closing each of the switches successively so that only the switch corresponding to the depressed key is completely closed.

8. In a typewriter telegraph, a typewriter having key bars, an electric circuit for each key bar, and means cooperating with each key to close the circuit related with the same, said means cooperating with different keys at different predetermined intervals.

9. In a typewriter telegraph, a typewriter having a group of key bars, a sending circuit for each key bar, and timing means in cooperative relation with each key bar of the group in succession and adapted to control the circuit related with a depressed key.

10. In a typewriter telegraph, a typewriter having a group of key bars, a timer put in operation by depressing any key bar, a sending circuit for each of the key bars, said timer cooperating with the key bars of the group in succession for closing the circuit, of a depressed key the timer being adapted to differently space the time of closing for each of the different circuits.

11. In a telegraph, a key for sending a starting impulse, a receiving key, a timer for sending a second impulse from the sending key, a timer for rendering the receiving key responsive to the second impulse, the two timers being synchronized and simultaneously started in operation by the sending key.

12. In a telegraph, a typewriter having keys for printing, the keys divided into groups, a key actuator for each group, a timer for successively selecting the keys of each of the groups, a line circuit for controlling said actuator and timer, means for sending a short impulse over the line circuit for starting the timer, and means for sending a second impulse in timed relation with the starting impulse for selecting a group to actuate a selected key.

13. In combination in a typewriter telegraph a typewriter having keys, circuit closing means for each key for particularly closing a circuit when a key is depressed, and a member for completing said closing in cooperation with a depressed key, means for actuating said member when a key is depressed to bring the member successively into cooperative relation with each key at different predetermined intervals for different keys.

14. In a typewriter telegraph, a plurality of interconnected electrically and manually operable typewriters, each having printing keys and synchronized independently operated means for successively bringing the corresponding keys into cooperative relation, means for sending an impulse from one typewriter for simultaneously starting all of said means, and means for sending a second impulse when the selected keys are in cooperative relation.

15. In a typewriter telegraph, a plurality of electrically interconnected typewriters, the combination with means at one typewriter for sending a starting impulse to another typewriter when a key is depressed, and sending a second impulse at pre-determined intervals after the starting impulse, said intervals being different for different keys and independently operated means in the other typewriter started in operation by said starting impulse for making the corresponding key responsive when the second impulse is given.

16. In a typewriter telegraph, a single line circuit, a plurality of typewriters, each having means for producing or utilizing pairs of impulses in the circuit for printing any one character of a group of characters, the spaces between the impulses of each pair being different for different characters, and means for making one typewriter responsive to the pairs of spaced impulses sent by another typewriter.

17. In a typewriter telegraph, a plurality of electrically interconnected typewriters, each having means for sending or responding to a starting impulse and a second impulse differently spaced for different characters, means for putting one typewriter in condition for sending and means for putting the other typewriter in condition for responding.

18. In a typewriter telegraph, a plurality of key typewriters, each having synchronized continuously operating independent timing motors and printing motors, and each having a time shaft and a printing magnet, means on one typewriter for sending a starting impulse to connect all the shafts to the timing motors, and means operated by the time shafts of the one typewriter for sending a second impulse at different intervals for different keys to operate the printing magnet of the other typewriter, and means operated by the time shaft of the other typewriter for making the different keys responsive to the printing magnet at intervals corresponding to the different intervals between the first and second impulses.

19. In a typewriter telegraph, a plurality of electrically interconnected typewriters, each having the keys divided into groups, timing means for simultaneously selecting the keys of each group in succession, and means co-ordinated with said means for selecting a group.

20. In a typewriter telegraph, a line, an electrical source normally disconnected from said line, a relay energized by the operation of the typewriter for connecting said source into circuit with the line for sending a starting impulse of fixed strength, and a second relay energized by the first relay for de-energizing the first relay, said second relay adapted to be connected to said source to the line to send a variable impulse.

21. In a telegraph, a plurality of keys, a line, an electrical source, a wheel cooperating with the keys for distributing impulses from the source to the line, means controlled by current in the line for turning the wheel one revolution, and means for momentarily connecting the source to the line to produce an impulse for starting the wheel.

22. In a printing telegraph, a line, a printing magnet, printing mechanism controlled for operation by the magnet, when energized, a local electrical power source, a lock-up relay connected for energizing from said local power source by an impulse in the line for connecting said magnet in circuit with said local source, and a normally closed switch opened by the operation of said mechanism for de-energizing said relay and magnet.

23. In a typewriter telegraph having keys resiliently held in normal position, a distributor wheel cooperating with the keys, means controlled by depressing a key for turning said wheel one revolution, a bar yieldably engaged with a depressed key for holding the key depressed, a cam on said wheel, and electromagnetic means controlled by the cam for disengaging the depressed key from the bar.

24. In a telegraph, a plurality of printing levers, a movable actuating bar, a contractor for each lever movable into a position between the lever and the bar, means for successively moving each contactor into and out of said position, and means co-ordinated with said means for operating the bar at the instant the contactor of a selected lever is in said position.

25. In a telegraph, a plurality of printing levers, a movable actuating bar, a slide mounted on each lever and movable into position between the lever and the bar, means for successively moving each slide into and out of said position, and means co-ordinated with said means for operating the bar when the slide of a selected lever is in said position.

26. In a telegraph, a group of printing levers, a movable actuating bar, a slide for each lever movable into a position between the lever and the bar to establish contact therebetween, means for successively moving each slide into and out of said position in a predetermined time relation, and means co-ordinated with said means for operating the bar at the instant a slide of a selected lever is in said position.

Signed at Chicago this 14th day of July 1926.

FRANK D. PEARNE.
LAWRENCE E. GOTSCH.